March 20, 1951 P. JEANLIN 2,545,466

LOUD-SPEAKER TELEPHONE INSTALLATION

Filed July 10, 1948 3 Sheets-Sheet 1

Pierre Jeanlin, Inventor
by Christy, Parmelee, & Strickland
Attorneys

March 20, 1951 P. JEANLIN 2,545,466

LOUD-SPEAKER TELEPHONE INSTALLATION

Filed July 10, 1948 3 Sheets-Sheet 2

Pierre Jeanlin, Inventor
by Christy, Parmelee, & Strickland
Attorneys

March 20, 1951 P. JEANLIN 2,545,466

LOUD-SPEAKER TELEPHONE INSTALLATION

Filed July 10, 1948 3 Sheets-Sheet 3

Pierre Jeanlin, Inventor by Christy, Parmelee & Strickland

Attorneys

Patented Mar. 20, 1951 2,545,466

UNITED STATES PATENT OFFICE 2,545,466

LOUD-SPEAKER TELEPHONE INSTALLATION

Pierre Jeanlin, Paris, France, assignor to Societe Le Teleampliphone, Paris, France Application July 10, 1948, Serial No. 38,057

6 Claims. (Cl. 179—1)

Figure 1:
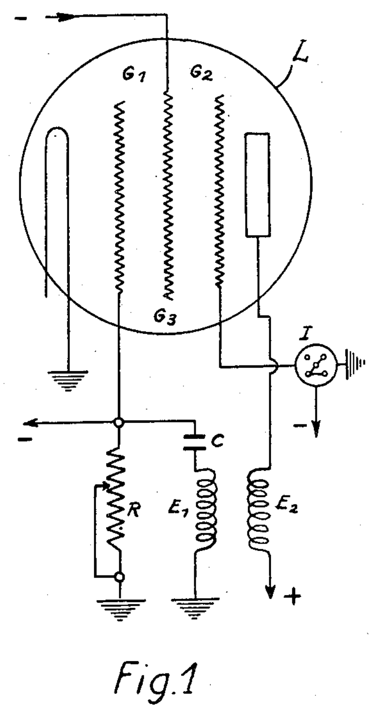

The invention has for its object the application to a two-way loudspeaker telephone installation of a multi-grid oscillator valve the continuous component of which is utilized, obtained by rectification of the high frequency, for polarizing to the cut-off point an auxiliary amplifier valve interposed in a blocking and unblocking circuit of line amplifiers in order to ensure the blocking of the amplifier of the way or line not used and the unblocking of the amplifier of the way used, the instantaneous blocking and unblocking of the line amplifiers being ensured by that high frequency oscillator which operates all or nothing.

In the French Patents No. 803,389 of June 20, 1935, and No. 837,339 of October 26, 1937, in the name of Jacques Levy, there are described loudspeaker telephone systems employing circuits for blocking and unblocking amplifiers by means of positive or negative tensions obtained from the modulation amplified and rectified. In the systems working by blocking one starts from free amplifiers the gain of which, in the absence of modulation, is sufficiently low for avoiding the setting up of the undesirable Larsen effect. But this reduced gain does not permit of using the apparatus in all the cases which present themselves in practice. There has been added therefore a circuit of over amplification which acts upon the free amplifier after blockage of the amplifier not used. This over amplification in theory could be as great as desired, since that, at the moment it comes into play, the other amplifier is neutralized and cannot be influenced by the loudspeaker in service. In practice, it is not so because it has been necessary to release this over amplification at the disappearance of the anode current of the blocked valve of the amplifier of the other way.

In these conditions, there is available only one limited variation of current, which produces only limited effects, and this variation is not instantaneous which constitutes a grave defect because it follows variations of important intensity during the conversation, the gain of the amplifier passing more or less rapidly through all the intermediate values between the minimum and the maximum.

In the United States application Serial No. 28,445 in the name of Jacques Levy filed May 21, 1948, for improvements in "Loudspeaker Telephone Installations," the line amplifiers are blocked in principle and only that belonging to the way used is unblocked at the desired moment. In this case, auxiliary amplifiers are used which produce tensions necessary for unblocking from the rectified modulation. This system presents the drawback indicated above of providing tensions variable as the modulation, hence irregularities in working.

The present invention seeks to remedy these defects by having recourse to a high frequency intermediary working all or nothing and instantaneously.

This system can be applied either to the circuit of over amplification in the blocking method, or to the unblocking circuits in the unblocking method. In both cases, the invention is applicable to systems of either two or four lines.

In both cases, use is made of a high frequency oscillator valve with multi-grids (preferably tri-grids) and the continuous component obtained by rectifying the high frequency is used for polarizing to the cut-off point a valve of fixed gradient (unblocking method), or, at a high value, a valve of variable gradient (over-amplification method) the oscillation being stopped at the desired moment by a negative tension obtained by rectification of the modulation and applied to the middle grid of the valve. This arrest of the oscillation produces, in the case of over amplification, the instantaneous passing from reduced gain to maximum gain of the amplifier and, in the case of unblocking, the liberation of the amplifier by instantaneous suppression of the polarization to the point of cut-off.

In the accompanying drawing two examples of application of the invention are illustrated diagrammatically.

Figure 2:
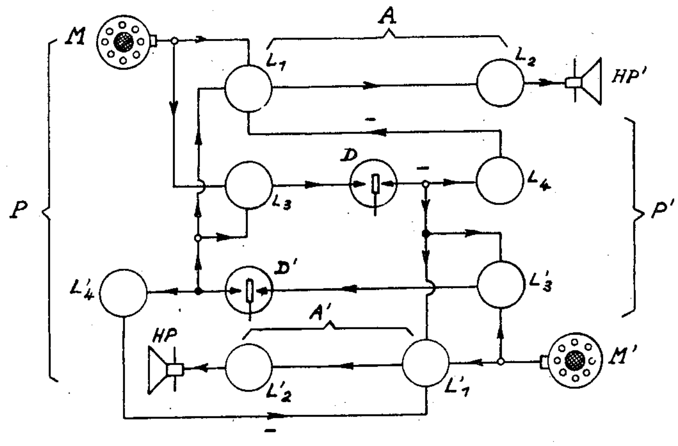
Figure 3:
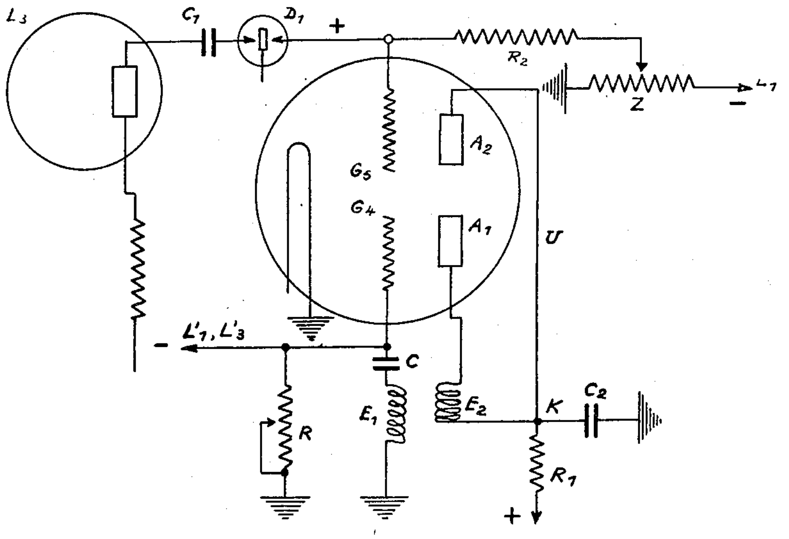
Figure 4:
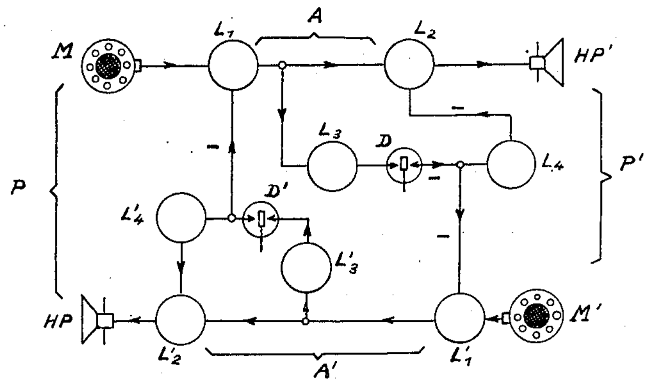
Figure 5:
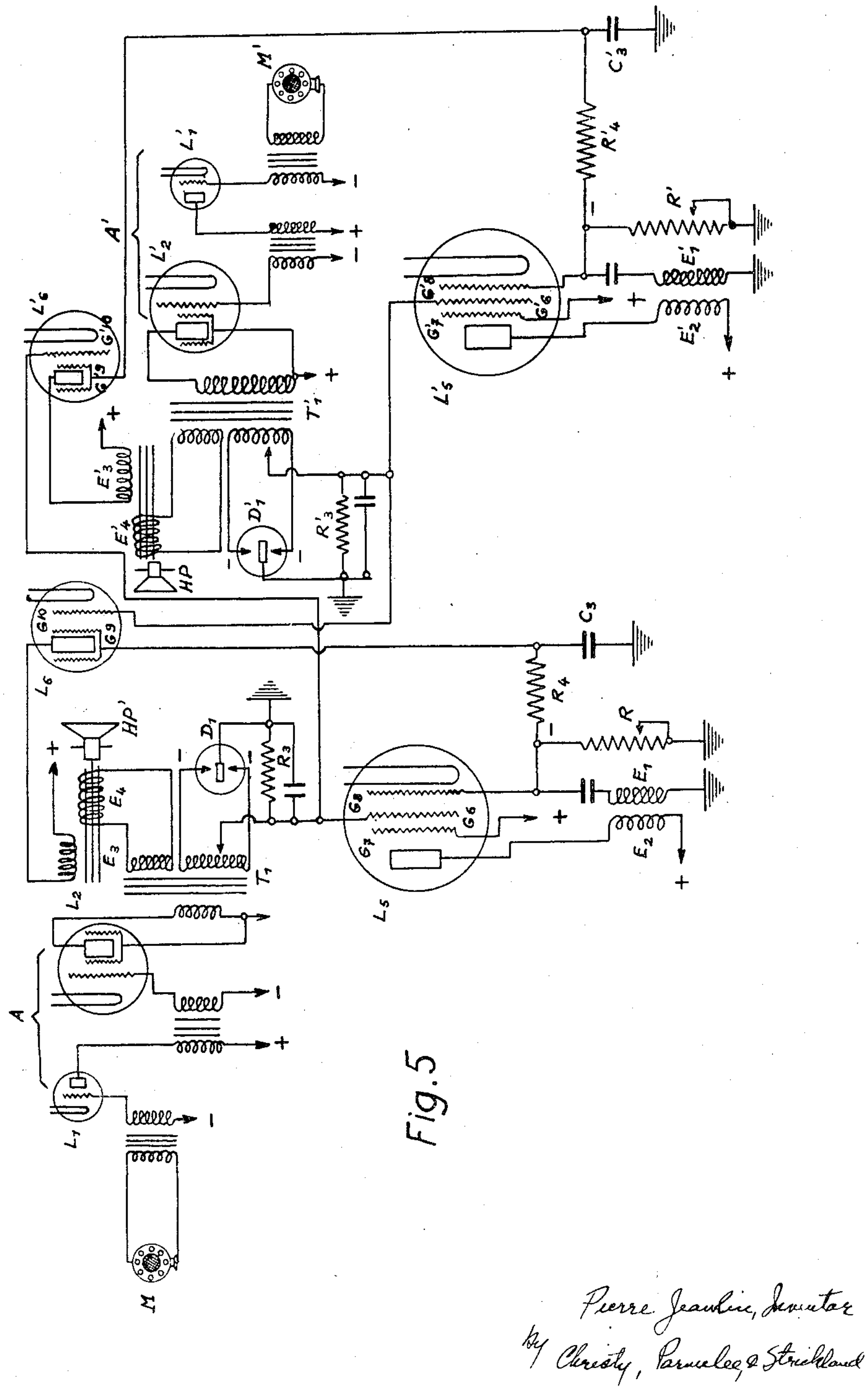

Figure 1 is a diagram of an oscillator valve serving as a basis of the invention, Figure 2 is a circuit diagram of an installation working by blocking and super-amplification, Figure 3 illustrates a variant of the oscillator, Figure 4 is a diagram similar to Figure 2 but showing an installation working by unblocking, and Figure 5 shows the application to another type of circuit.

In Figure 1 there is seen an oscillatory high frequency vacuum valve L with multiple grids, preferably a tri-grid. In such a valve, the value and direction of the coupling of the windings $E_1$, $E_2$ connected respectively to the first grid $G_1$ and to the anode of the valve, produces the entry into oscillation of the valve on a frequency determined by the characteristics of the windings, the different capacities and the tensions.

If there is introduced into the circuit of the grid $G_1$ a condenser C and a variable resistance R as shown in Figure 1, it may be said that the high frequency oscillating tension determines at the terminals of R the appearance of a negative tension by rectification of the high frequency by the valve constituted by the cathode of L and $G_1$. This tension is therefore proportional to the high frequency tension and has for effect to polarize the valve itself. For suitable values of R and C, it may be said also that this polarization becomes sufficient for blocking the oscillation which is arrested and resumed only after discharge of C into R.

It is advantageous to utilize this phenomenon for causing the valve L to function after the manner of an auto-blocking oscillator, that is to say, by giving to R and C such values that the series of discharges of C into R superposes on the high frequency oscillation (for example 20 megocycles) a low frequency oscillation of relaxation (for example 12.5 kilocycles—saw-tooth frequency). In this manner, even if the impulse received is feeble, it is certain that at the end of a very short time the oscillator L will be blocked. In practice, the phenomenon of blocking is obtained by using a condenser C of 500 pf. (1 pf.$=10^{-6}$ $\mu f$) for a resistance R of 250,000 ohms.

In these conditions, if a low negative tension be applied to a grid other than $G_1$, the grid $G_2$ for example, for instance by means of a suitable switch I, the disappearance of oscillation is obtained.

In Figure 2 a circuit diagram is given for an installation working by blocking. For simplicity, a single drawing line is used to represent the two wires of each way, and circles are used to represent the different valves employed.

In Figure 2 it will be seen that the installation comprises two stations P and $P^1$ each comprising a microphone M or $M^1$ and a loudspeaker HP or $HP^1$. Between M and $HP^1$ on the one hand and between $M^1$ and HP on the other hand, there are interposed two amplifiers A and $A^1$ each constituted by two valves $L_1$, $L_2$ for A and $L^1_1$ and $L^1_2$ for $A^1$. Two auxiliary amplifiers $L_3$ for A and $L^1_3$ for $A^1$ are connected in shunt respectively between M and $L_1$ and between $M^1$ and $L^1_1$. Two oscillator valves $L_4$ and $L^1_4$ of the kind shown in Figure 1 act respectively upon the amplifiers A and $A^1$. Finally, two rectifiers D and $D^1$ are interposed respectively between $L_3$ and $L_4$ and between $L^1_3$ and $L^1_4$.

It will be seen moreover from Figure 2 that $L_1$ and $L_4$ are connected directly, as also are $L^1_1$ and $L^1_4$, and that between D and $L_4$ there are connected in shunt the valves $L^1_1$ and $L^1_3$ whilst between $D^1$ and $L^1_4$ are connected in shunt the valves $L_1$ and $L_3$.

This being the case, the operation is as follows:

The amplification of A is normally reduced by the superpolarization of $L_1$ by the negative tension coming from $L_4$; similarly, the amplification $A^1$ is reduced by the braking of $L^1_1$ by the negative tension coming from $L^1_4$. It results that when the installation is idle, no start of whistling noise can occur, thus avoiding the phenomenon known as the Larsen effect.

When a person speaks at M, the speech passes feebly and reaches $HP^1$. At the same time, $L_3$ amplifies strongly and D rectifies the modulation for producing a negative tension. This tension is transmitted to $L^1_1$ and $L^1_3$ for putting them to the cut-off condition and to $L_4$ for stopping the high frequency oscillation there. Consequently, $A^1$ is put out of service and the influence of $HP^1$ upon $M^1$ has no importance (suppression of the Larsen effect).

It follows that, the auxiliary amplifier $L^1_3$ being blocked, $P^1$ can take over the speech only when P ceases to speak (the time constant is, for example, 0.1 second).

Finally, the braking of $L_1$ disappears with the high frequency oscillation. It then takes all its power, all the more rapidly because there is no need of low frequency filters in the connection $L_4$—$L_1$ as in previously known systems, these filters introducing a high time constant by their resistances and condensers of high values. Here, on the contrary, the braking being obtained from rectified high frequency, very small condensers suffice for eliminating it and transmitting only the continuous component. The imposition of the high frequency on the valve $L_1$ is, moreover, without importance since the amplifier A is a low frequency amplifier.

Between two syllables, the time constant being suitably chosen, the amplifier $A^1$ can work in the same manner as A when $P^1$ takes over the speech.

It will be understood that the principal amplifiers A and $A^1$, the auxiliary amplifiers $L_3$ and $L^1_3$, and the oscillators $L_4$ and $L^1_4$ can comprise any number of valves without modifying the principle of working of the installation in accordance with the invention. Similarly, the rectifiers D and $D^1$ can be dry rectifiers, liquid rectifiers or valves without changing the results obtained by the circuit connections herein described and without departing from the spirit of the invention.

Figure 3 illustrates another oscillator which permits of an amplification of the blocking action.

Instead of blocking the high frequency oscillator by a negative tension applied to $G_3$ of the valve of Figure 1, recourse is had to a valve such as the double triode of the type 6SC7 (Figure 3). In this case there is a common cathode, two grids $G_4$ and $G_5$ and two anodes $A_1$ and $A_2$. The negative impulse applied to $G_3$ of Figure 1 is here replaced by a positive impulse applied to $G_5$ previously polarized near to the point of cut-off. $G_5$ is connected on the one hand to the anode of $L_3$ (seen in the circuit in Figure 2) by a rectifier $D_1$ uncoupled by a condenser $C_1$ and, on the other hand, by way of a resistance $R_2$, to a potentiometer Z one terminal of which is earthed whilst the other terminal is connected to $L_1$. $G_4$ is connected on the one hand, like $G_1$ of Figure 1, through a condenser C to a winding $E_1$ coupled with the winding $E_2$ of the circuit $A_1$ and on the other hand to the valves $L^1_1$ and $L^1_3$, a resistance R in shunt to $G_4$ being earthed. Finally, $A_1$ and $A_2$ are connected together by a circuit U which at K is branched to an uncoupling condenser $C_2$ and a resistance $R_1$. The positive impulse on $G_5$ produces a sharp increase of plate current from $A_2$ into U and a fall of tension in the resistance $R_1$. This fall of tension then stops the oscillation by variation in the coupling $E_1$, $E_2$, by the appearance of the blocking phenomenon above described. In practice, it is found that a tension of $+6$ volts is sufficient for reducing by 15 to 20 volts the tension sent to $L^1_1$ and $L^1_3$. There is thus obtained an important effect of amplification.

Figure 4 is a diagram analogous to Figure 2 and, as in that figure, a single drawing line represents the different connections, and circles represent the various valves employed.

In the case of Figure 4, which shows the application of the invention to an installation of the general type described in the aforesaid United States application Serial No. 28,445 in the name of Jacques Levy, the two amplifiers are not free but on the contrary are blocked, and only that one which serves for locking the other is unblocked. But in the improvements of the present invention, the amplifiers which produce unblocking tensions from the rectified modulation are suppressed and owing to the high frequency oscillator the principal amplifier is blocked or unblocked without possibility of irregular working.

The same devices are used as in Figure 2 but the circuit is slightly different. The auxiliary amplifiers $L_3$ and $L^1_3$ are here connected in shunt between $L_1$ and $L_2$ or $L^1_1$ and $L^1_2$. Moreover $L_2$ and $L_4$, $L^1_2$ and $L^1_4$ are directly connected. Finally, $L_1$ is connected in shunt between $D^1$ and $L^1_4$, whilst $L^1$ is similarly connected between D and $L_4$.

The operation is as follows:

When the installation is not in use, the valve $L_2$ is blocked to the cut-off by the negative tension delivered by $L_4$ from the rectified high frequency. Similarly, $L^1_2$ is blocked by $L^1_4$.

When a person speaks at M nothing arrives at $HP^1$, but the auxiliary amplifier $L_3$ permits the blocking of $L_4$ through D and this liberates $L_2$; at the same time the shunt D—$L^1_1$, in blocking $L^1_1$, avoids any influence of $HP^1$ upon $M^1$ being transmitted to HP (suppression of the Larsen effect).

When P ceases to speak and $P^1$ takes over the speech, $A^1$ is unblocked in the manner described with reference to A.

A great advantage of working by unblocking is that it permits of using a loudspeaker and a microphone together in a single box.

It will be noted that when, as is preferable, the above described phenomenon of blocking is used by giving suitable valves to R and C of Figure 1, it is necessary to select a frequency sufficiently low for the auxiliary oscillation in order to give an appreciable cut-out time, this frequency being however sufficiently high for being easily eliminated by the filter interposed between $L_4$ and $L_1$ (rectifier D and valve $L_3$, Figure 4) and not to fall within the audible range.

The system now to be described can also be applied to the circuits described in United States application Serial No. 28,446 in the name of Jacques Levy filed May 21, 1948, for "Arrangement for Avoiding the Larsen Effect in Loud-Speaker Telephone Installations" for procuring tensions for controlling the excitation of loudspeakers or microphones.

In this application Serial No. 28,446, the installation comprises in combinations means for limiting, during idle periods, the excitation field of the microphone and loudspeaker of each station (or of only one of these two units) to such an intensity that no start of whistling (Larsen effect) can occur during such periods, and means for causing the complete disappearance of the excitation field of the aforesaid unit or units belonging to the unused line and for increasing at the same time this field for the aforesaid unit or units belonging to the line used, when a person speaks before one of the microphones.

In one arrangement, the one or more windings, coils or other means producing the said field of a line are traversed, for example in series, by the anode current of an electronic tube the control grid of which is polarized by a tension imposed upon a resistance traversed by the rectified anode current from the electronic tube corresponding to the other line and by a tension imposed upon a resistance traversed by the current, rectified, coming from the amplifier of the other line, in such manner that when the amplifier puts out a relatively intense current (conversation) the electronic tube of the line not used is blocked. This results, on the one hand, in the disappearance of the excitation current of the units in the line not used and, on the other hand, in the disappearance of the over polarization of the electronic tube of the line used, that is to say, in the reinforcement of the excitation of the units in that line.

According to the present invention, the tensions controlling the excitation means of the microphone and loudspeaker of each station are produced by the rectified component of the high frequency of an oscillator of the kind described with reference to Figure 1. In this case, the blocking of the oscillator can be controlled by an auxiliary amplifier (as in the examples in Figures 2 and 4 but it is possible, more simply, to make direct use of the principal amplifier, since the modulation, even retransmitted to the corresponding loudspeaker, remains without effect, the loudspeaker not being excited at this moment.

Figure 5 shows the circuit diagram for such a case. Between the microphone M and the loudspeaker $HP^1$, there is interposed, as before, an amplifier A consisting of two valves $L_1$ and $L_2$. From $L_2$ the current is transmitted by a transformer $T_1$ on the one hand to the loudspeaker $HP^1$ and on the other hand to the rectifier $D_1$ shunted by the resistance $R_3$, one terminal of the latter being connected to the grid $G_6$ of the oscillator $L_5$ (identical with L of Figure 1). The loudspeaker $HP^1$ is excited by a winding around a fixed core upon which is movably mounted a movable coil $E_4$ connected with the diaphragm of the loudspeaker. The excitation windings of M (not shown) and $HP^1$ are traversed by the anode current of an electronic tube $L_6$, the grid $G_9$ of which is connected to the grid $G_8$ of $L_5$ (corresponding to $G_1$ of Figure 1) by way of a resistance $R_4$ uncoupled by a condenser $C_3$, the rest of the circuit being identical with that of Figure 1. Moreover, the grid $G_{10}$ of $L_6$ is connected to the grid $G^1_6$ of an oscillator $L^1_5$ identical to $L_5$ and branched upon the second line (which connects $M^1$ to HP) in the same manner that $L_5$ is connected in the line which goes from M to $HP^1$; similarly, $G_6$ is connected to the grid $G^1_{10}$ of an electronic tube $L^1_6$ identical to $L_6$ and the anode current of which traverses the excitation windings (not shown) of $M^1$ and $E^1_3$ of HP. (If desired, moreover, only one of the units M and $HP^1$, or $M^1$ and HP, may be excited by a winding such as $E_3$ or $E^1_3$.)

In these conditions, when the installation is idle, $L_5$ in oscillating polarizes to cut-off point the tube $L^1_6$ through the connection $G_6$ to $G^1_{10}$. Similarly, $L^1_5$ in oscillating polarizes to cut-off point the tube $L_6$. This results in the blocking of these tubes and, consequently, a very feeble excitation of the excitation windings of the microphone and loudspeaker at each station. The Larsen effect cannot therefore be produced whilst there is no speech at either of the stations.

This being the case, when speech is made at M, the modulation current received by $T_1$ and rectified by $D_1$ causes the appearance at the exit of $R_3$ of a negative tension which strongly polarizes $G_6$ of $L_5$. This results in the arrest of the oscillation of $L_5$ and consequently the suppression of the over polarization of $L^1_6$; the field of the excitation windings of M and $HP^1$ is then reinforced (which means increase in the sensitiveness of these units) by suppression of the over polarization of $L_6$, whilst the field of the excitation windings of $M^1$ and HP is suppressed by suppression of the anode current of $L^1_6$.

In the case where auxiliary amplifiers are used, the blocking circuits from $G_6$ and $G^1_6$ are taken to a suitable grid of each of these auxiliary amplifiers instead of the grids $G^1_{10}$ and $G^{10}$ of the tubes $L^1_6$ and $L_6$.

It will be seen that the application of the invention to the circuits described in the aforesaid patent application Serial No. 28,446 presents the same advantages as the application to the circuits described in the other patents referred to in the name of Jacques Levy, since there again the blocking of the tube $L_6$ (or $L^1_6$) is done all or nothing owing to the oscillator $L_5$ or $L^1_5$, whereas in the patent of May 29, 1947 it is the modulation of M (or $M^1$) which acts upon $L_6$ (or $L^1_6$) from which arises the above described defect that the excitation fields of the microphone and loudspeaker of each station pass more or less rapidly through all the intermediate values between the minimum and the maximum.

What I claim is:

1. A loudspeaker telephone installation operating by blocking and over amplification, comprising in combination two separate transmission lines each comprising a microphone and a loudspeaker with a connecting circuit therebetween including two principal amplifier valves, an auxiliary amplifier valve in shunt between the microphone and the first principal amplifier in each line, an oscillator in each line connected, on the one hand, to the first principal amplifier and, on the other hand, by way of a rectifier to the auxiliary amplifier of the same line, and a double shunt between the rectifier and the oscillator of one line connecting on the one hand with the first principal amplifier and on the other hand by way of a rectifier with the auxiliary amplifier of the same line, and a double shunt between the rectifier and the oscillator of a line connecting on the one hand with the auxiliary amplifier of the second line and on the other hand with the first principal amplifier of the second line.

2. A loudspeaker telephone installation operating by blocking, comprising in combination two separate transmission lines each comprising a microphone and a loudspeaker with a connecting circuit therebetween including two principal amplifier valves, an auxiliary amplifier valve in shunt between the two principal amplifiers of each line, an oscillator in each line connected on the one hand to the second principal amplifier and on the other hand through a rectifier to the auxiliary amplifier of the same line and a shunt between the oscillator and rectifier of one line connecting with the first principal amplifier of the other line.

3. A loudspeaker telephone installation operating by over-amplification, comprising in combination two separate transmission lines each comprising a microphone and a loudspeaker with a connecting circuit therebetween including two principal amplifier valves, an auxiliary amplifier valve in shunt between the microphone and the first principal amplifier of each line, an oscillator in each line constituted by a double triode one grid of which is connected on the one hand through the medium of a rectifier and a condenser to the anode of the auxiliary amplifier of the same line and on the other hand through the medium of a potentiometer to the first principal amplifier of that line, the two anodes being connected by a circuit to a point from which are branched an earthed condenser and a resistance connected to the high tension feed, and a double shunt between the rectifier and the second grid of the double triode of one line connected on the one hand to the auxiliary amplifier of the second line and on the other hand to the first principal amplifier of the second line.

4. A loudspeaker telephone installation wherein during idle periods the field excitations of the microphone and loudspeaker of each transmission line are limited, comprising in combination two separate transmission lines each comprising a microphone and a loudspeaker with a connecting circuit therebetween including an amplifier, a three-winding transformer coupled on the one hand to the said amplifier and on the other hand to the loudspeaker and to a rectifier shunted by a resistance, a tri-grid oscillator the middle grid of which is connected to a terminal of this resistance, and an electronic tube the anode current of which transverses in series the excitation windings of the microphone and loudspeaker of each line, the tube of the first line having a grid connected to the middle grid of the oscillator of the second line and the tube of the second line having a grid connected to the middle grid of the oscillator of the first line which produces the oscillation of that valve.

5. A two-way loudspeaker telephone installation comprising a pair of transmission lines respectively provided with amplifying means therein, each of said lines having a vacuum tube oscillator including a circuit responsive to oscillation of the tube for applying a control voltage to the amplifying means therein to limit its gain to a value effective to prevent an acoustic coupling between said lines, and an auxiliary amplifier operative in response to the impression of a signal on one of said lines for developing a potential for stopping oscillation of the oscillator for said one line and for preventing transmission of signals by the other of said lines.

6. A two-way loudspeaker telephone installation comprising a pair of transmission lines respectively provided with amplifying means therein, a vacuum tube oscillator for each of said lines normally operable to generate a control potential, means including a rectifier for connecting said oscillator to the amplifying means of the line in which it is located to limit the gain of such amplifying means to a value effective to prevent an acoustic coupling between said said lines, and means in each of said lines responsive to the impression of a signal to be transmitted thereby for rendering its oscillator inoperative to generate a gain limiting control potential and for applying a potential to the other of said lines to prevent the transmission of signals over such other line.

PIERRE JEANLIN.

REFERENCES CITED

The following references are of record in the file of this patent:

UNITED STATES PATENTS

| Number | Name | Date |
|---|---|---|
| 1,507,889 | Nicolson | Sept. 9, 1924 |
| 2,164 185 | Bertnolli et al. | June 27, 1939 |
| 2,205,142 | Hoard | June 18, 1940 |
| 2,236,645 | Levy | Apr. 1, 1941 |
| 2,366,011 | Donaldson | Dec. 26, 1944 |
| 2,386,515 | Swart | Oct. 9, 1945 |

FOREIGN PATENTS

| Number | Country | Date |
|---|---|---|
| 812,019 | France | Apr. 28, 1937 |